United States Patent
Chang

(10) Patent No.: US 11,415,842 B2
(45) Date of Patent: Aug. 16, 2022

(54) PIXEL ELECTRODE AND DISPLAY PANEL

(71) Applicants: CHONGQING HKC OPTOELECTRONICS TECHNOLOGY CO., LTD., Chongqing (CN); HKC CORPORATION LIMITED, Shenzhen (CN)

(72) Inventor: Hongyan Chang, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 693 days.

(21) Appl. No.: 16/326,929

(22) PCT Filed: Nov. 23, 2018

(86) PCT No.: PCT/CN2018/117089
§ 371 (c)(1),
(2) Date: Feb. 21, 2019

(87) PCT Pub. No.: WO2020/056911
PCT Pub. Date: Mar. 26, 2020

(65) Prior Publication Data
US 2021/0333601 A1    Oct. 28, 2021

(30) Foreign Application Priority Data
Sep. 20, 2018   (CN) .......................... 201821539110.5

(51) Int. Cl.
*G02F 1/1343*   (2006.01)

(52) U.S. Cl.
CPC ................................ *G02F 1/13439* (2013.01)

(58) Field of Classification Search
None
See application file for complete search history.

(56) References Cited

U.S. PATENT DOCUMENTS

| 9,036,122 B2* | 5/2015 | Kim | .................... G02F 1/13439 349/141 |
| 2004/0004690 A1* | 1/2004 | Yamaguchi | ....... G02F 1/133707 349/141 |

(Continued)

FOREIGN PATENT DOCUMENTS

| CN | 102236220 A | 11/2011 |
| CN | 102402078 A | 4/2012 |

(Continued)

OTHER PUBLICATIONS

Bing Han, the ISA written comments, Jun. 2019, CN.

*Primary Examiner* — Ryan Crockett

(57) ABSTRACT

The present disclosure provides a pixel electrode and a display panel. The pixel electrode includes a trunk portion including a first trunk and a second trunk and branch portions. The first trunk and the second trunk are pixel electrode areas. An intersection point of the first trunk and the second trunk is a central point of the trunk portion. the first trunk intersects with the second trunk to form four equal pixel electrode areas and the four pixel areas are four branch portions. Each of the four branch portions includes a plurality of branches. An end of each branch or an end of an extension line thereof intersects with the first trunk or an extension line thereof. An other end of each branch or an other end of the extension line thereof intersects with the second trunk or an extension line thereof.

14 Claims, 5 Drawing Sheets

(56) References Cited

U.S. PATENT DOCUMENTS

| | | | | |
|---|---|---|---|---|
| 2007/0139598 | A1* | 6/2007 | Choi | G02F 1/133707 |
| | | | | 349/139 |
| 2009/0109391 | A1* | 4/2009 | Ito | G02F 1/134363 |
| | | | | 349/141 |
| 2012/0307190 | A1* | 12/2012 | Zhang | G02F 1/133707 |
| | | | | 349/142 |
| 2013/0010248 | A1* | 1/2013 | Kang | G02F 1/1393 |
| | | | | 349/139 |
| 2015/0015829 | A1* | 1/2015 | Chen | G02F 1/133707 |
| | | | | 349/96 |
| 2017/0059949 | A1* | 3/2017 | Tsuei | G02F 1/133707 |
| 2017/0235194 | A1* | 8/2017 | Shin | G02F 1/13439 |
| | | | | 349/139 |
| 2017/0285416 | A1* | 10/2017 | Cheng | G02F 1/134309 |

FOREIGN PATENT DOCUMENTS

| | | |
|---|---|---|
| CN | 204557026 U | 8/2015 |
| CN | 105911776 A | 8/2016 |
| CN | 106483722 A | 3/2017 |

* cited by examiner

PIXEL ELECTRODE AND DISPLAY PANEL

The present application claims foreign priority to Chinese Patent Application No. CN201821539110.5, titled: PIXEL ELECTRODE AND DISPLAY PANEL, filed on Sep. 20, 2018 in the State Intellectual Property Office of China, and the entire contents of which is hereby incorporated by reference.

TECHNICAL FIELD

The present disclosure relates to a field of display technology, and in particular to a pixel electrode and a display panel.

BACKGROUND

The statements herein merely provide background information related to the present disclosure and do not necessarily constitute the prior art.

A liquid crystal display (LCD) apparatus has many advantages, such as having a thin body, saving-power, no radiation, and is widely used. A conventional liquid crystal display apparatus is mostly a backlight liquid crystal display apparatus. The backlight liquid crystal display apparatus includes a liquid crystal display panel and a backlight module. Operating principle of the display apparatus is that liquid crystal (LC) molecules are disposed between two substrates, where the two substrates are parallelly disposed, and a driving voltage applied on the two substrates controls rotation direction of the LC molecules, so that light of a backlight module are refracted to generate images.

The LCD apparatus includes a glass substrate, a pixel electrode, and liquid crystals, where the pixel electrode is formed on the glass substrate, and a signal voltage is applied to the pixel electrode to form an electric field, thereby controlling deflection of the liquid crystals. Thus, the LCD apparatus displays different images. The pixel electrode is design to includes a snip-shaped first trunk and a strip-shaped second trunk. The second trunk and the first trunk divide an overall pixel electrode area into four equal areas.

Such a pixel electrode structure has a lower transmittance, and further, display differences occur, and display effect is bad.

SUMMARY

An object of the present disclosure is to provide a pixel electrode and a display panel to improve a transmittance of the pixel electrode.

To achieve the above object, the present disclosure provides a pixel electrode. The pixel electrode includes:

a trunk portion including a first trunk and a second trunk, and the first trunk and the second trunk are pixel electrode areas, and an intersection point of the first trunk and the second trunk is a central point of the trunk portion, and branch portions.

the first trunk intersects with the second trunk to form four equal pixel electrode areas where the four pixel areas are four branch portions. Each of the four branch portions includes a plurality of branches. An end of each branch or an end of an extension line of each branch intersects with the first trunk or an extension line of the first trunk. An other end of each branch or an other end of the extension line of each branch intersects with the second trunk or an extension line of the second trunk.

Optionally, the branches in a same order outward from the central point of the trunk portion or the extension lines of the branches in a same order outward from the central point of the trunk portion are connected on a same position of the first trunk and the second trunk or are connected on a same position of the extension lines of both of the first trunk and the second trunk.

Optionally, the intersection point of the first trunk and the second trunk is the central point of the trunk portion. The branches in a same order outward from the central point of the trunk portion or the extension lines of the branches in a same order outward from the central point of the trunk portion are stagger connected with the first trunk and the second trunk or the extension lines of both of the first trunk and the second trunk.

Optionally, a center of the first trunk is perpendicularly intersected with a center of the second trunk. An included angle between an intersection of each branch of each of the branch portions or the extension line of each branch and the second trunk or the extension line of the second trunk is an acute angle. An angle of each included angle is different from each other.

Optionally, each branch consists of two segments. Each branch is in a bent shape.

Optionally, each branch consisting of two segments is bent toward the central point of the trunk portion.

Optionally, each branch consists of multiple segments, and each branch is in a bent shape.

Optionally, each branch consists of three segments, and each branch is in a bent shape.

Optionally, each branch consisting of three segments is bent toward the central point of the trunk portion.

Optionally, each branch is smooth circular arc-shaped.

Optionally, each branch of smooth circular arc-shaped is bent toward the central point of the trunk portion Optionally, each branch is a smooth wave shape.

Another object of the present disclosure is to provides a pixel electrode. The pixel electrode includes:

a trunk portion including a first trunk and a second Mink; and the first trunk and the second trunk are pixel electrode areas; an intersection point of the first trunk and the second trunk is a central point of the trunk portion; and branch portions.

the first trunk intersects with the second trunk to form four equal pixel electrode areas where the four pixel areas are four branch portions. Each of the four branch portions includes a plurality of branches. An end of each branch or an end of an extension line of each branch intersects with the first trunk or an extension line of the first trunk. An other end of each branch or an other end of the extension line of each branch intersects with the second trunk or an extension line of the second trunk. Each branch consists of three segments, and each branch is bent toward the central point of the trunk portion and is in a bent shape.

Another object of the present disclosure is to provides a display panel. The display panel includes a pixel electrode. The pixel electrode includes:

a trunk portion including a first trunk and a second trunk; and the first trunk and the second trunk are pixel electrode areas; an intersection point of the first trunk and the second trunk is a central point of the trunk portion; and branch portions.

the first trunk intersects with the second trunk to form four equal pixel electrode areas where the four pixel areas are four branch portions. Each of the four branch portions includes a plurality of branches. An end of each branch or an end of an extension line of each branch intersects with the first trunk or an extension line of the first trunk. An other end of each branch or an other end of the extension line of each branch intersects with the second trunk or an extension line of the second trunk.

Another object of the present disclosure is to provide a method for manufacturing a display panel. The method includes steps for forming a gate electrode, an insulating layer, a semiconductor silicon layer, a source and a drain, a passivation layer, and a pixel electrode on a glass substrate.

The pixel electrode includes a first trunk, a second trunk intersected with the first trunk, and branch portions equally formed by an intersection of the first trunk and the second trunk. The branch portions include a plurality of branches.

Optionally, in the step for forming the branches, an end of each branch or an end of an extension line of each branch intersects with the first trunk or an extension line of the first trunk, An other end of each branch or an other end of the extension line of each branch intersects with the second trunk or an extension line of the second hunk.

Compared with an comprised angle between each branch of each of the branch portions and a second trunk toward the first mink is 135 degrees. Each branch extends outward from the first trunk, the second trunk, or the intersection point of the first trunk and the second trunk. A structure of the pixel electrode is of asterisk-shaped. An inclined direction of liquid crystals is pointing to the central point of the trunk portion of the pixel electrode where the central point is the intersection point of the first trunk and the second trunk, such that a vortex-shaped liquid crystal rotation area is formed on the central point of the trunk portion, and dark fringes are appeared, results in that light-transmitting effect of original light transmitting areas is poor, the transmittance is decreased, and further, display difference occurs. In present disclosure, the end of each branch or the end of the extension line of each branch intersects with the first trunk or the extension line of the first trunk, and the other end of each branch or the other end of the extension line of each branch intersects with the second trunk or the extension line of the second trunk. An opening formed by each branch or the extension line of each branch and the second trunk or the extension line of the first trunk towards the first trunk. That is, the branches face to the central point where the first trunk intersected with the second trunk, which makes the liquid crystals to incline toward the first trunk and a vertical trunk, prevents the liquid crystals from inclining toward the central point where the first trunk intersected with the second trunk, avoids an occurrence of the vortex-shaped liquid crystal rotation area formed on the central point of the trunk portion, and further, avoids an occurrence of dark fringes. Thus, the light-transmitting effect of the light-transmitting area is good, the transmittance is high, and the display difference is small.

BRIEF DESCRIPTION OF DRAWINGS

The drawings are included to provide a further understanding of embodiments of the present disclosure, which form portions of the specification and are used to illustrate implementation manners of the present disclosure and are intended to illustrate operating principles of the present disclosure together with the description. Apparently, the drawings in the following description are merely some of the embodiments of the present disclosure, and those skilled in the art are able to obtain other drawings according to the drawings without contributing any inventive labor. In the drawing.

DETAILED DESCRIPTION

Figure 1:
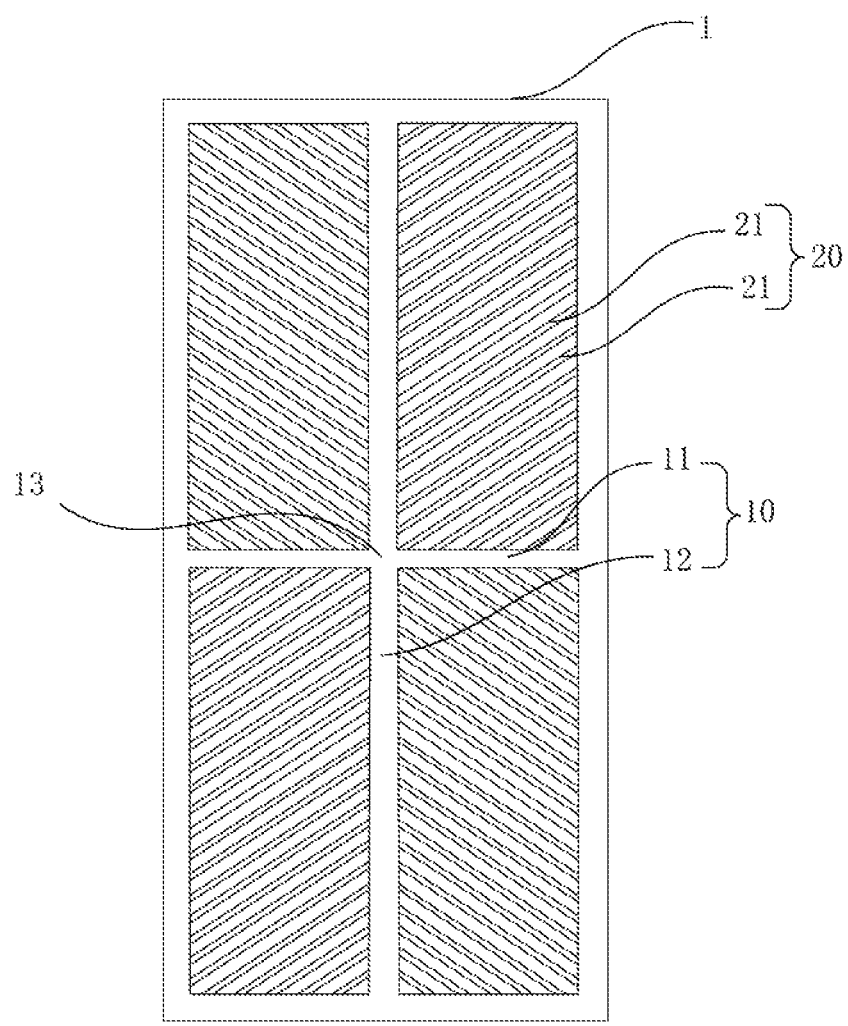
FIG. 1 is a schematic diagram of a pixel electrode.
Figure 2:
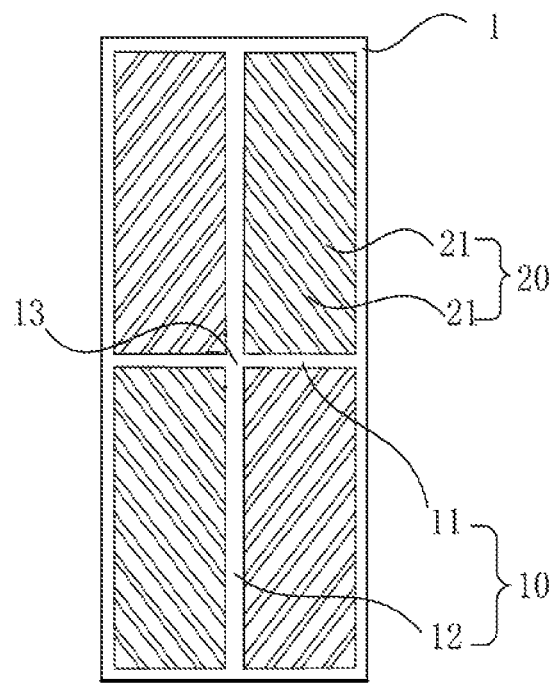
FIG. 2 is a schematic diagram of a pixel electrode of the present disclosure.
Figure 3:
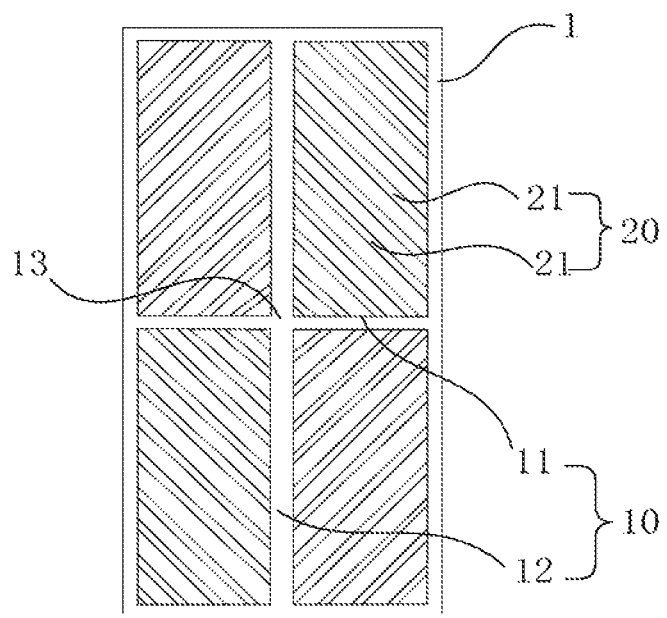
FIG. 3 is a schematic diagram of staggered branches of the present disclosure.
Figure 4:
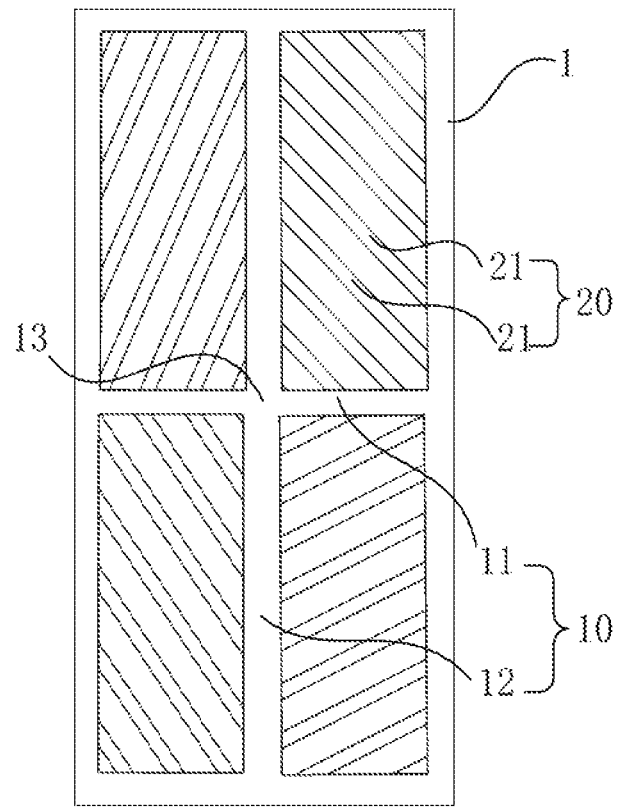
FIG. 4 is a schematic diagram of branches of the present disclosure where an included angle of each branch is different.
Figure 5:
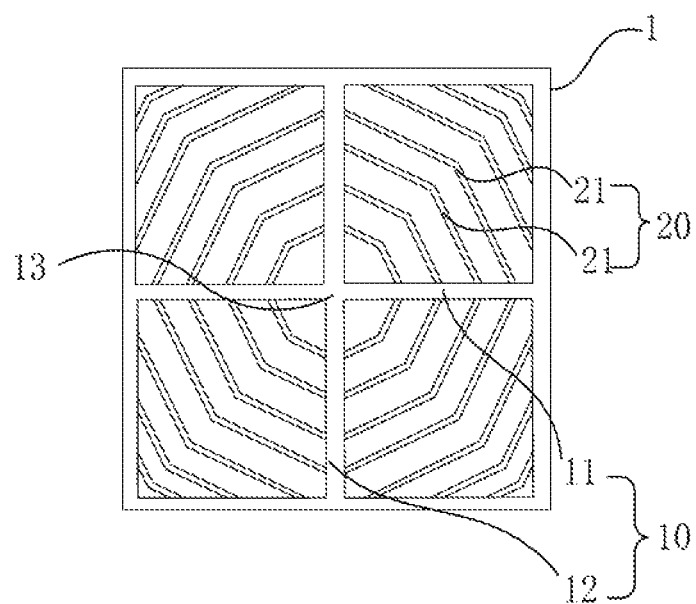
FIG. 5 is a schematic diagram of branches consisting of two segments of the present disclosure.

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified. In addition, the term "include" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to include plurals. It should also be understood that the terms "include" and/or "include" used herein specify the existence of stated features, integers, steps, operation, units and/or assemblies, not excluding the existence or addition of one or more other features, integers, steps, operation, units, assemblies and/or combinations of these.

The present disclosure is described below in conjunction with the drawings and optional embodiments.

As shown in FIG. 1 to FIG. 8, In one or more embodiments, the present disclosure provides a pixel electrode. The pixel electrode 1 includes:

a trunk portion 10 including a first trunk 11 and a second trunk 12, where the first trunk 11 and the second trunk 12 are pixel electrode areas; an intersection point of the first trunk 11 and the second trunk 12 is a central point 13 of the trunk portion 10; and branch portions 20.

The first trunk 11 intersects with the second trunk 12 to form four equal pixel electrode areas where the four pixel areas are four branch portions 20.

Each of the four branch portions 20 includes a plurality of branches 21. An end of each branch 21 or an end of an extension line of each branch 21 intersects with the first trunk 11 or an extension line of the first trunk 11. An other end of each branch 21 or an other end of the extension line of each branch 21 intersects with the second trunk 12 or an extension line of the second trunk 12.

Each branch 21 consists of three segments, and each branch 21 is bent toward the central point 13 of the trunk portion 10 and is in a bent shape.

Compared with a design shown in FIG. 1, an included angle between each branch 21 of each of the branch portions 20 and a second trunk 12 toward the first trunk 11 is 0.135 degrees. Each branch 21 extends outward from the first trunk 11, the second trunk 12, or the intersection point of the first trunk 11 and the second trunk 12. A structure of the pixel electrode 1 is of asterisk-shaped. An inclined direction of liquid crystals is pointing to the central point 13 of the trunk portion 10 where the central point is the intersection point of the first trunk 11 and the second trunk 12, such that a vortex-shaped liquid crystal rotation area is formed on the central point 13 of the trunk portion 10, and dark fringes are appeared, results in that light-transmitting effect of original light transmitting areas is poor, the transmittance is decreased, and further, display difference occurs. In present disclosure, the end of each branch or the end of the extension line of each branch intersects with the first trunk or the extension line of the first trunk, and the other end of each branch or the other end of the extension line of each branch intersects with the second trunk or the extension line of the second trunk. An opening formed by each branch or the extension line of each branch and the second trunk or the extension line of the first trunk towards the first trunk. That is, the branches 21 face to the central point 13 where the first trunk intersected with the second trunk 12, which makes the liquid crystals to incline toward the first trunk 12 and a vertical trunk, prevents the liquid crystals from inclining toward the central point 13 of the trunk portion 10 where the first trunk 11 intersected with the second trunk 12, avoids an occurrence that the vortex-shaped liquid crystals rotation area feinted on the central point 13 of the trunk portion 10, and further, avoids an occurrence of dark fringes. Thus, the light-transmitting effect of the light-transmitting area is good, the transmittance is high, and the display difference is small.

In another embodiment of the present disclosure, as shown in FIG. 1 to FIG. 5, providing a pixel electrode 1. The pixel electrode 1 includes:

a trunk portion 10 including a first trunk 11 and a second trunk 12, where the first trunk 11 and the second trunk 12 are pixel electrode areas; an intersection point of the first trunk 11 and the second trunk 12 is a central point 13 of the trunk portion 10; and branch portions 20.

The first trunk 11 intersects with the second trunk 12 to form four equal pixel electrode areas where the four pixel areas are four branch portions 20.

Each of the four branch portions 20 includes a plurality of branches 21 end of each branch 21 or an end of an extension line of each branch 21 intersects with the first trunk 11 or an extension line of the first trunk 11. An other end of each branch 21 or an other end of the extension line of each branch 21 intersects with the second trunk 12 or an extension line of the second trunk 12.

In one or more embodiments, the branches 21 in a same order outward from the central point 13 of the trunk portion 10 or the extension lines of the branches 21 in a same order outward from the central point 13 of the trunk portion 10 are connected on a same position of the first trunk 11 and the second trunk 12 or are connected on a same position of the extension lines of both of the first trunk 11 and the second trunk 12.

The branches 21 in the same order outward from the central point 13 of the trunk portion 10 or the extension lines of the branches 21 in the same order outward from the central point 13 of the trunk portion 10 are connected on the same position of the first trunk 11 and the second trunk 12 or are connected on the same position of the extension lines of both of the first trunk 11 and the second trunk 12. The extension line of the branches 21 in the same order on the four branch portions 20 or the branches 21 in the same order on the four branch portions 20 constitute a diamond shape, which makes the liquid crystals to incline toward the first trunk 12 and the vertical trunk, prevents the liquid crystals from inclining toward the central point 13 of the trunk portion 10 where the first trunk 11 intersected with the second trunk 12, avoids the occurrence that the vortex-shaped liquid crystal rotation area formed on the central point 13 of the trunk portion 10, and further, avoids the occurrence of dark fringes Thus, the light-transmitting effect of the light-transmitting area is good and the transmittance is high. Meanwhile, distribution of the structure of the pixel electrode 1 of the present disclosure is more regular, and a shape of the pixel electrode 1 is more regular, which make a photomask corresponding to the pixel electrode 1 easier to be manufactured, and make a process of the photomask simpler.

In one or more embodiments, the branches 21 in a same order outward from the central point 13 of the trunk portion 10 or the extension lines of the branches 21 in a same order outward from the central point 13 of the trunk portion 10 are stagger connected with the first trunk 11 and the second trunk 12 or the extension lines of both of the first trunk 11 and the second trunk 12.

The branches 21 in the same order or the extension lines of the branches 21 in the same are stagger connected with the first trunk 11 and the second trunk 12 or the extension lines of both of the first trunk 11 and the second trunk 12, which makes the liquid crystals to deflect more in direction and reduces visual color difference.

In one or more embodiments, a center of the first trunk 11 is perpendicularly intersected with a center of the second trunk 12. An included angle between an intersection of each branch 21 of each of the branch portions 20 or the extension line of each branch 21 and the second trunk 20 or the extension line of the second trunk 12 is an acute angle. An angle of each included angle is different from each other.

The included angle between the intersection of each branch of each of the branch portions or the extension line of each branch and the second trunk or the extension line of the second trunk is the acute angle. The branches face to the central point where the first trunk intersected with the second mink, which makes the liquid crystals to incline toward the first trunk and the vertical trunk, prevents the liquid crystals from inclining toward the central point where the first trunk intersected with the second trunk, avoids the occurrence of the vortex-shaped liquid crystal rotation area formed on the central point of the trunk portion, and further, avoids the occurrence of dark fringes. Thus, the light-transmitting effect of the light-transmitting area is good, the transmittance is high, and the display difference is small. The angle of each included angle is different from each other, thus, the deflection angles of liquid crystals between each branch portion 20 are various, and the visual color difference is reduced.

In one or more embodiments, each branch 21 consists of two segments. Each branch 21 is in a bent shape.

Each branch 21 consists of two segments and ach branch 21 is in the bent shape. An included angle between each segments and the first trunk or second trunk is different. Thus, distribution directions of the branches 21 increase, the inclined direction of the liquid crystals increase correspondingly, and the visual color difference is reduced.

In one or more embodiments, each branch 21 consisting of two segments is bent toward the central point 13 of the trunk portion 10.

Each branch 21 consisting of two segments is bent toward the central point 13 of the trunk portion 10. The branches are arched outward, which reduces a tendency of the liquid crystals to incline toward the center point 13 of the mink portion 13, causes the liquid crystal to fall outward, avoids the occurrence of the vortex-shaped liquid crystal rotation area formed on the central point 13 of the trunk portion 10, and further, avoids the occurrence of dark fringes. Thus, the light-transmitting effect of the light-transmitting area is good and the transmittance is high.

Figure 6:
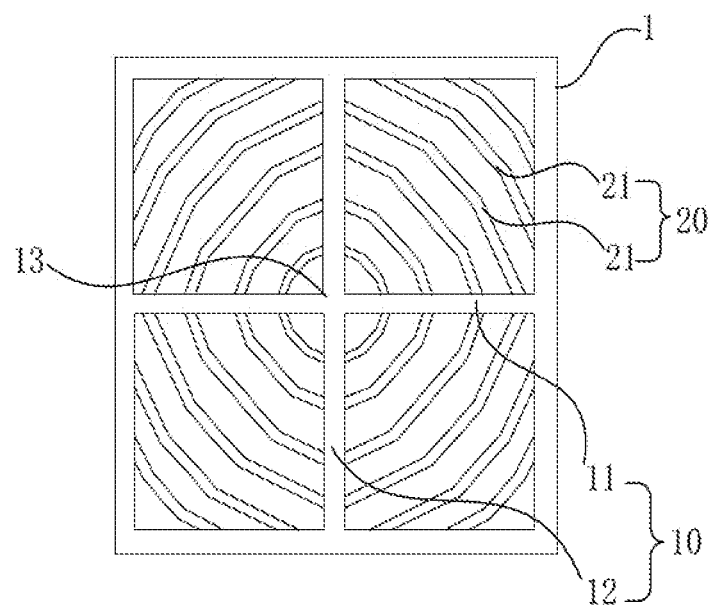
FIG. 6 is a schematic diagram of branches consisting of three segments of the present disclosure.

In another embodiment of the present disclosure, differ from the above embodiments, as shown in FIG. 6, each branch 21 consists of multiple segments, and each branch 21 is in a bent shape.

Each branch 21 consists of multiple segments, and each branch 21 is in a bent shape. Thus, distribution directions of the branches 21 increase, the inclined direction of the liquid crystals increase correspondingly, and the visual color difference is reduced.

In one or more embodiments, each branch 21 consists of three segments, and each branch 21 is in a bent shape.

Each branch 21 consists of three segments, and each branch 21 is in a bent shape. An included angle between each segments and the first trunk 11 or second trunk 12 is different, which ensures a various distribution directions of the branches 21, thus, the inclined direction of the liquid crystals increase correspondingly, and the visual color difference is reduced. Moreover, the branch 21 consists three segments, which makes the structure of the pixel electrode 1 being not too complicated, and makes the process of the pixel electrode 1 simple.

In one or more embodiments, each branch 21 consisting of three segments is bent toward the central point 13 of the trunk portion 10.

Each branch 21 consisting of three segments is bent toward the central point 13 of the trunk portion 10. The branches 21 are arched outward, which reduces a tendency of the liquid crystals to incline toward the center point 13 of the trunk portion 13, causes the liquid crystal to fall outward, avoids the occurrence of the vortex-shaped liquid crystal rotation area formed on the central point 13 of the trunk portion 10, and further, avoids the occurrence of dark fringes. Thus, the light-transmitting effect of the light-transmitting area is good and the transmittance is high.

Figure 7:
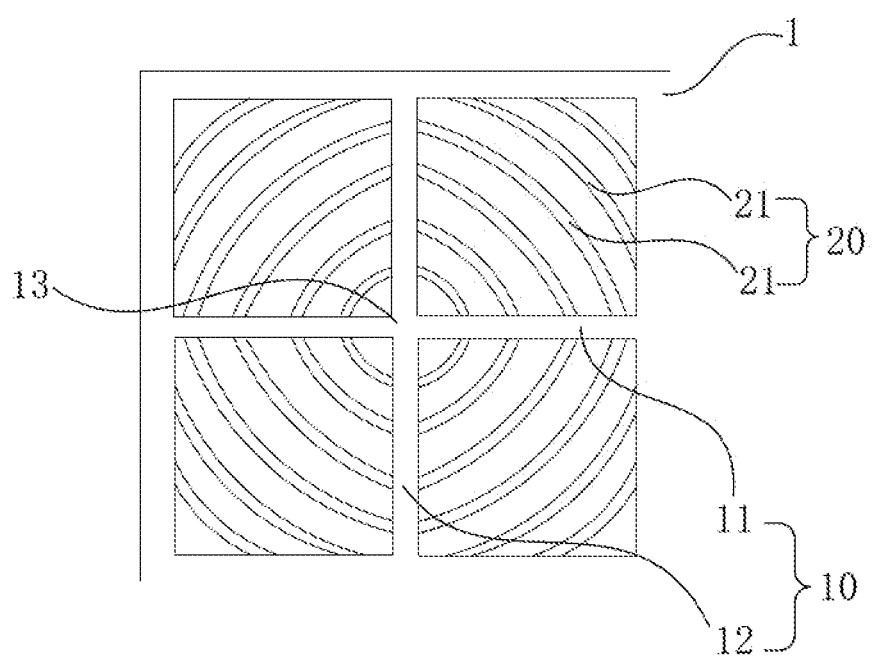
FIG. 7 is a schematic diagram of branches of circular arc-shaped of the present disclosure.

In another embodiment of the present disclosure, differ from the above embodiments, as shown in FIG. 7, each branch 21 is smooth circular arc-shaped.

Each branch 21 is smooth circular arc-shaped, thus, the inclined direction of the liquid crystals increase correspondingly, and the visual color difference is reduced.

In one or more embodiments, each branch 21 of smooth circular arc-shaped is bent toward the central point 13 of the trunk portion 10.

Each branch 21 of smooth circular arc-shaped is bent toward the central point 13 of the trunk portion 10. The branches 21 are arched outward, which reduces a tendency of the liquid crystals to incline toward the center point 13 of the trunk portion 13, causes the liquid crystal to fall outward, avoids the occurrence of the vortex-shaped liquid crystal rotation area formed on the central point 13 of the trunk portion 10, and further, avoids the occurrence of dark fringes. Thus, the light-transmitting effect of the light-transmitting area is good and the transmittance is high.

Figure 8:
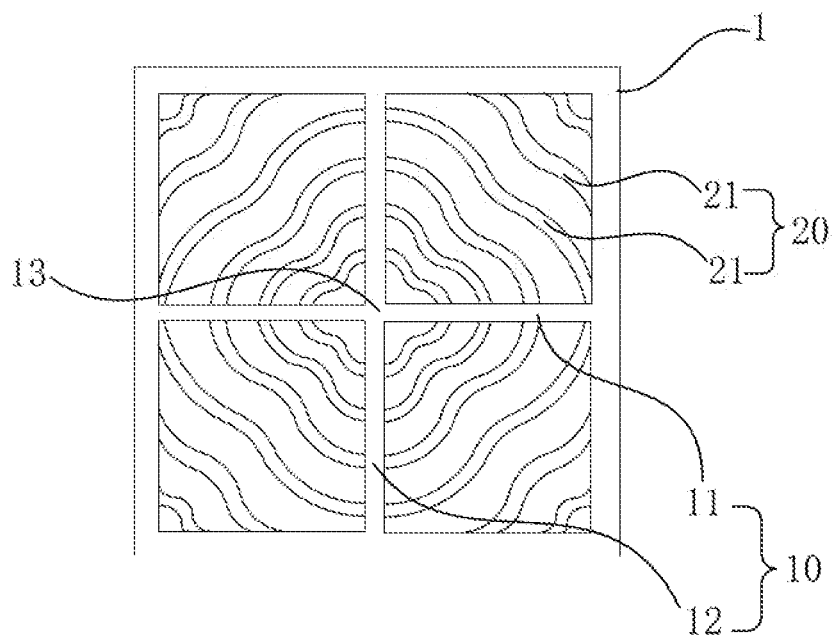
FIG. 8 is a schematic diagram of branches of wave shape of the present disclosure.
Figure 9:
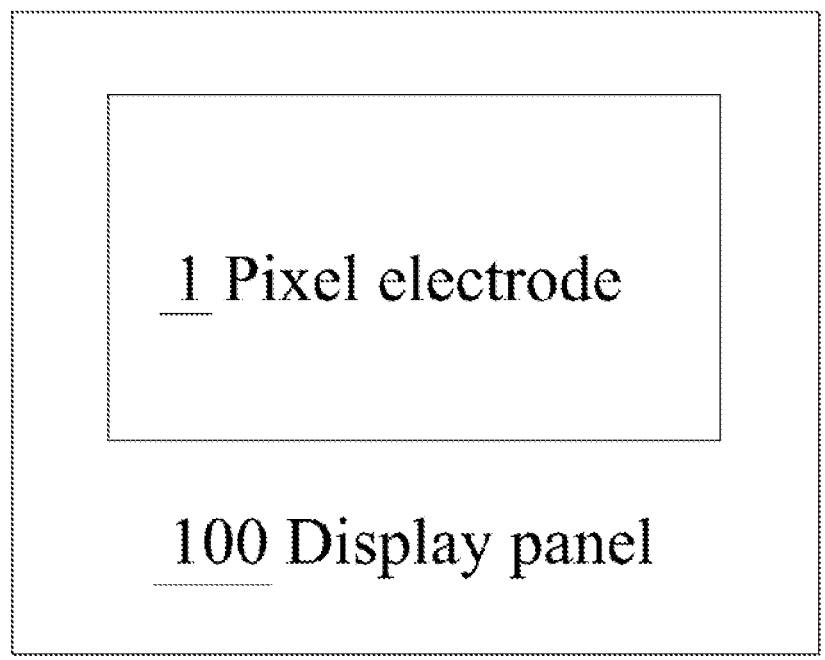
FIG. 9 is a schematic diagram of a display panel of the present disclosure.

In one or more embodiments, as shown in FIG. 8, each branch 21 is a smooth wave shape.

Each branch 21 is a smooth wave shape, thus, the inclined direction of the liquid crystals increase correspondingly, and the visual color difference is reduced.

In another embodiment of the present disclosure, as shown in FIG. 1 to FIG. 8, the present disclosure provides a display panel 100. The display panel 100 includes a pixel electrode 1.

The pixel electrode 1 includes:

a trunk portion 10 including a first trunk 11 and a second trunk 12, where the first trunk 11 and the second trunk 12 are pixel electrode areas; an intersection point of the first trunk 11 and the second trunk 12 is a central point 13 of the trunk portion 10; and branch portions 20.

The first trunk 11 intersects with the second trunk 12 to form four equal pixel electrode areas where the four pixel areas are four branch portions 20.

Each of the four branch portions 20 includes a plurality of branches 21. An end of each branch 21 or an end of an extension line of each branch 21 intersects with the first trunk 11 or an extension line of the first trunk 11. An other end of each branch 21 or an other end of the extension line of each branch 21 intersects with the second trunk 12 or an extension line of the second trunk 12.

Compared with a design shown in FIG. 1, an included angle between each branch 21 of each of the branch portions 20 and a second trunk 12 toward the first think 11 is 135 degrees. Each branch 21 extends outward from the first trunk 11, the second trunk 12, or the intersection point of the first trunk 11 and the second trunk 12. A structure of the pixel electrode 1 is of asterisk-shaped. An inclined direction of liquid crystals is pointing to the central point 13 of the trunk portion 10 where the central point is the intersection point of the first trunk 11 and the second trunk 12, such that a vortex-shaped liquid crystal rotation area is formed on the central point 13 of the trunk portion 10, and dark fringes are appeared, results in that light-transmitting effect of original light transmitting areas is poor, the transmittance is decreased, and further, display difference occurs. In present disclosure, the end of each branch or the end of the extension line of each branch intersects with the first trunk or the extension line of the first trunk, and the other end of each branch or the other end of the extension line of each branch intersects with the second trunk or the extension line of the second trunk. An opening formed by each branch or the extension line of each branch and the second trunk or the extension line of the first trunk towards the first trunk. That is, the branches 21 face to the central point 13 where the first trunk intersected with the second trunk 12, which makes the liquid crystals to incline toward the first trunk 12 and a vertical trunk, prevents the liquid crystals from inclining toward the central point 13 of the trunk portion 10 where the first trunk 11 intersected with the second trunk 12, avoids an occurrence that the vortex-shaped liquid crystals rotation area formed on the central point 13 of the trunk portion 10, and further, avoids an occurrence of dark fringes. Thus, the light-transmitting effect of the light-transmitting area is good, the transmittance is high, and the display difference is small.

In another embodiment of the present disclosure, the present disclosure provides a method for manufacturing a display panel. The method includes steps for forming a gate electrode, an insulating layer, a semiconductor silicon layer, a source and a drain, a passivation layer, and a pixel electrode 1 on a glass substrate.

The pixel electrode 1 includes a first trunk 11, a second trunk 12 intersected with the first trunk 11, and branch portions 20 equally formed by an intersection of the first trunk 11 and the second trunk 11. The branch portions 20 include a plurality of branches 21.

In one or more embodiments, in the step for forming the branches 21, an end of each branch 21 or an end of an extension line of each branch 21 is intersected with the first trunk 11 or an extension line of the first trunk 11. An other end of each branch 21 or an other end of the extension line of each branch 21 intersects with the second trunk 12 or an extension line of the second trunk 12.

In present disclosure, the end of each branch or the end of the extension line of each branch intersects with the first trunk or the extension line of the first trunk, and the other end of each branch or the other end of the extension line of each branch intersects with the second trunk or the extension line of the second trunk. An opening formed by each branch or the extension line of each branch and the second trunk or the extension line of the first trunk towards the first trunk. That is, the branches 21 face to the central point 13 where the first trunk intersected with the second trunk 12, which makes the liquid crystals to incline toward the first trunk 12 and a vertical trunk, prevents the liquid crystals from inclining toward the central point 13 of the trunk portion 10 where the first trunk 11 intersected with the second trunk 12, avoids an occurrence that the vortex-shaped liquid crystals rotation area formed on the central point 13 of the trunk portion 10, and further, avoids an occurrence of dark fringes. Thus, the light-transmitting effect of the light-transmitting area is good, the transmittance is high, and the display difference is small.

The above content is a further detailed description of the present disclosure in conjunction with the specific optional embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A pixel electrode, comprising:
a trunk portion comprising a first trunk and a second trunk; and the first trunk and the second trunk are pixel electrode areas; an intersection point of the first trunk and the second trunk is a central point of the trunk portion; and
branch portions;
wherein the first trunk and the second trunk intersect to form four equal pixel electrode areas and the four pixel areas are four branch portions; each of the four branch portions comprises a plurality of branches; and an end of each branch or an end of an extension line of each branch intersects the first trunk or an extension line of the first trunk; another end of each branch or another end of the extension line of each branch intersects the second trunk or an extension line of the second trunk;
wherein every four branches in the respective four branch portions that lie in a same order outward from the central point of the trunk portion or the extension lines of every four branches in the respective four branch portions that lie in a same order outward from the central point of the trunk portion are connected to different positions that are staggered apart on the first trunk and the second trunk or are connected on different positions that are staggered apart on the extension lines of both of the first trunk and the second trunk;
wherein a center of the first trunk perpendicularly intersects a center of the second trunk; an included angle formed at an intersection between each branch in each of the branch portions or the extension line of the branch and the second trunk or the extension line of the second trunk is an acute angle.

2. The pixel electrode according to claim 1, wherein an angle of each included angle is different from each other.

3. The pixel electrode according to claim 1, wherein each branch consists of two segments; each branch is bent toward the central point of the trunk portion and is in a bent shape, wherein the two segments form an included angle that lies opposite to the corresponding right angle formed by the first trunk and the second trunk and that is small than 180 degrees.

4. The pixel electrode according to claim 1, wherein each branch consists of two segments; each branch is bent toward the central point of the trunk portion and is in a bent shape, wherein the two segments form an included angle that lies opposite to the corresponding right angle formed by the first trunk and the second trunk and that is small than 180 degrees.

5. The pixel electrode according to claim 1, wherein each branch consists of multiple segments, and each branch is in a bent shape, wherein every two adjacent segments among the multiple segments of each branch form an included angle that lies opposite to the corresponding right angle formed by the first trunk and the second trunk and that is small than 180 degrees.

6. The pixel electrode according to claim 5, wherein each branch consists of three segments.

7. The pixel electrode according to claim 6, wherein each branch consists of three segments; each branch is bent toward the central point of the trunk portion and is in a bent shape.

8. The pixel electrode according to claim 1, wherein each branch consists of multiple segments, and each branch is in a bent shape, wherein every two adjacent segments among the multiple segments of each branch form an included angle that lies opposite to the corresponding right angle formed by the first trunk and the second trunk and that is small than 180 degrees.

9. The pixel electrode according to claim 1, wherein each branch is smooth circular arc-shaped, wherein a concave side of the smooth circular arc-shaped branch faces directly opposite the intersection point of the first trunk and the second trunk.

10. The pixel electrode according to claim 1, wherein each branch is a smooth wave shape, which is a smooth curve.

11. The pixel electrode according to claim 1, wherein each branch consists of three segments, wherein each segment is smooth circular arc-shaped and a concave side of the smooth circular arc-shaped segment faces directly opposite the intersection point of the first trunk and the second trunk.

12. The pixel electrode according to claim 1, wherein the four branch portions comprise an upper left branch portion, an upper right branch portion, a lower left branch portion, and a lower right branch portion, wherein the plurality of branches in the upper left branch portion are disposed in symmetry with the plurality of branches in the lower right branch portion about the intersection point of the first trunk and the second trunk, and the plurality of branches in the upper right branch portion are disposed in symmetry with the plurality of branches in the lower left branch portion about the intersection point of the first trunk and the second trunk, and wherein the plurality of branches in the upper left branch portion are disposed in asymmetry with the plurality of branches in the upper right branch portion.

13. The pixel electrode according to claim 1, wherein the four branch portions comprise an upper left branch portion, an upper right branch portion, a lower left branch portion, and a lower right branch portion, wherein the plurality of branches in the upper left branch portion are disposed in symmetry with the plurality of branches in the lower left branch portion, and the plurality of branches in the upper right branch portion are disposed in symmetry with the plurality of branches in the lower right branch portion about the intersection point of the first trunk and the second trunk, and wherein the plurality of branches in the upper left branch portion are disposed in asymmetry with the plurality of branches in the upper right branch portion.

14. A display panel comprising a pixel electrode, wherein the pixel electrode comprises:
  a trunk portion comprising a first trunk and a second trunk; and the first trunk and the second trunk are pixel electrode areas; an intersection point of the first trunk and the second trunk is a central point of the trunk portion;
  branch portions;
  wherein the first trunk intersects the second trunk to form four equal pixel electrode areas and the four pixel areas are four branch portions; each of the four branch portions comprises a plurality of branches; and an end of each branch or an end of an extension line of each branch intersects the first trunk or an extension line of the first trunk; another end of each branch or another end of the extension line of each branch intersects with the second trunk or an extension line of the second trunk;
  wherein every four branches in the respective four branch portions that lie in a same order outward from the central point of the trunk portion or the extension lines of every four branches in the respective four branch portions that lie in a same order outward from the central point of the trunk portion are connected to different positions that are staggered apart on the first trunk and the second trunk or are connected on different positions that are staggered apart on the extension lines of both of the first trunk and the second trunk;
  wherein a center of the first trunk perpendicularly intersects a center of the second trunk; an included angle formed at an intersection between each branch in each of the branch portions or the extension line of the branch and the second trunk or the extension line of the second trunk is an acute angle.

* * * * *